United States Patent
Bussey, Jr. et al.

(10) Patent No.: US 6,604,344 B2
(45) Date of Patent: Aug. 12, 2003

(54) BAGGING MACHINE

(76) Inventors: Harry Bussey, Jr., 960 Cape Marco Dr., Unit 1803, Marco Island, FL (US) 33937; Harry (Buddy) Bussey, III., 4 Windy Hill, Atlantic Hills, NJ (US) 07716

( * ) Notice: Subject to any disclaimer, the term of this patent is extended or adjusted under 35 U.S.C. 154(b) by 0 days.

(21) Appl. No.: 09/998,290

(22) Filed: Nov. 30, 2001

(65) Prior Publication Data

US 2003/0101696 A1 Jun. 5, 2003

(51) Int. Cl.[7] .......................... B65B 43/26; B65B 39/02
(52) U.S. Cl. .......................... 53/570; 53/253; 53/284.7; 53/373.6; 53/384.1; 141/166; 141/182; 141/314; 141/392
(58) Field of Search ................. 53/570, 253, 284.7, 53/384.1, 373.6, 370.6; 141/166, 182, 313–317, 392

(56) References Cited

U.S. PATENT DOCUMENTS

| | | | | | |
|---|---|---|---|---|---|
| 2,079,132 | A | * | 5/1937 | Stathem | 53/373.6 |
| 2,097,449 | A | * | 11/1937 | Cundall et al. | 53/373.6 |
| 2,340,883 | A | * | 2/1944 | Kimball et al. | 53/284.7 |
| 2,426,401 | A | * | 8/1947 | Mack | 53/570 |
| 2,639,069 | A | * | 5/1953 | West | 141/166 |
| 2,899,786 | A | * | 8/1959 | Harker | 53/384.1 |
| 3,097,459 | A | * | 7/1963 | Rausch | 53/570 |
| 3,265,251 | A | * | 8/1966 | Lense | 222/168.5 |
| 3,968,626 | A | * | 7/1976 | Hobbs | 141/166 |
| 3,974,628 | A | * | 8/1976 | Konstantin | 53/384.1 |
| 4,106,535 | A | * | 8/1978 | Davis | 141/392 |
| 4,726,170 | A | * | 2/1988 | Sawa et al. | 53/570 |
| 4,873,815 | A | * | 10/1989 | Tetenborg et al. | 53/570 |
| 5,001,889 | A | * | 3/1991 | Mueller | 53/570 |
| 5,088,267 | A | * | 2/1992 | Gee | 53/386.1 |
| 5,315,812 | A | * | 5/1994 | Germunson | 53/384.1 |
| 5,375,396 | A | * | 12/1994 | Huwelmann | 53/570 |
| 5,435,114 | A | * | 7/1995 | Moehlenbrock et al. | 53/570 |
| 5,957,172 | A | * | 9/1999 | DeGreef et al. | 53/570 |
| 6,035,606 | A | * | 3/2000 | Bussey, III et al. | 53/253 |

FOREIGN PATENT DOCUMENTS

| | | | | | |
|---|---|---|---|---|---|
| GB | 2207651 | A | * | 2/1989 | B65B/39/00 |
| JP | 6-122421 | A | * | 5/1994 | B65B/43/26 |
| JP | 6-151519 | A | * | 7/1994 | B65B/51/10 |

* cited by examiner

Primary Examiner—Stephen F. Gerrity
(74) Attorney, Agent, or Firm—Francis C. Hand; Carella,Byrne,Bain et al.

(57) ABSTRACT

The bagging machine has a rotary table with openings to receive a series of bags. Each bag is staked onto four pins two of which are stationary and two of which are laterally movable. After filling, the bag is heat sealed using a pair of heat seal bars and then severed by a fly knife above the heat seal. The bag is then removed manually or automatically.

23 Claims, 10 Drawing Sheets

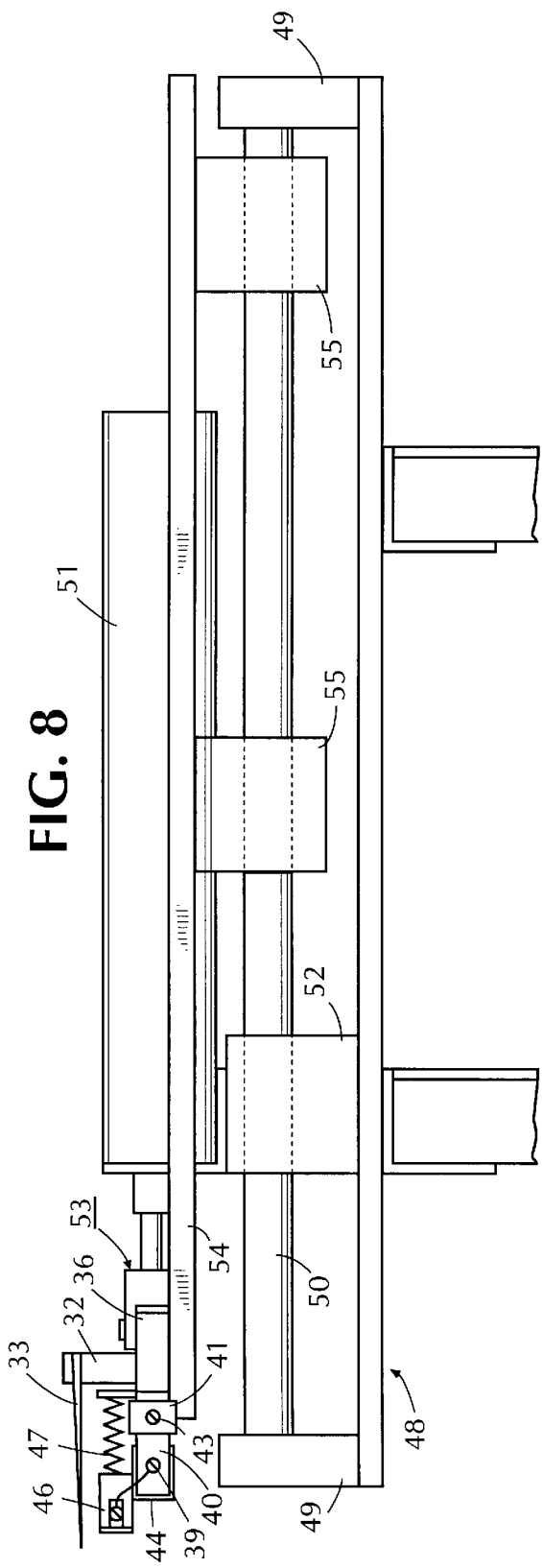
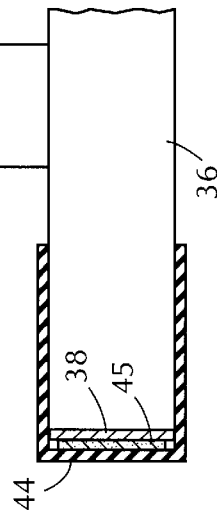
FIG. 10
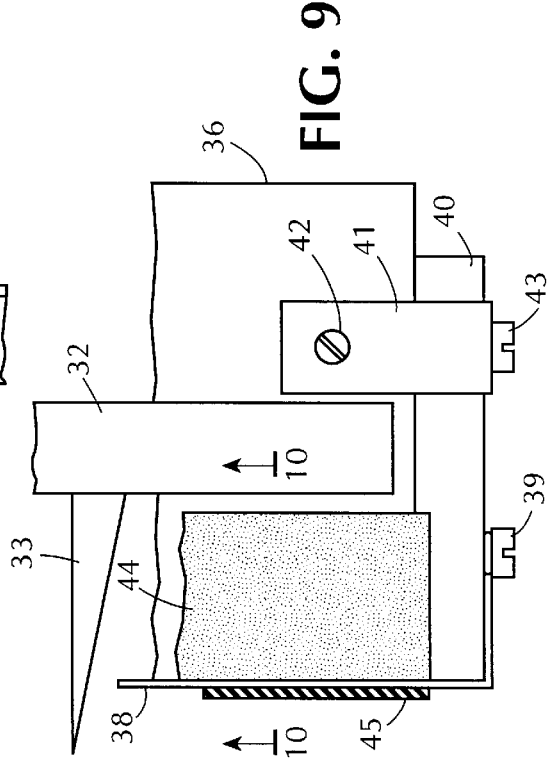
FIG. 9

BAGGING MACHINE

This invention relates to a bagging machine. More particularly, this invention relates to a bagging machine for particulate material. Still more particularly, this invention relates to a bagging machine for foamed loose-fill packaging elements.

Heretofore, various types of filling or bagging machines have been used for filling bags with particulate materials, such as foamed plastic packaging elements. For example, U.S. Pat. No. 6,035,606 describes a filling machine in which a bag is suspended within an opening of a conveyor from a plurality of upstanding posts. As the conveyor moves the bag past various stations, air is blown into the bag to open the bag, a flow of particulate material is delivered into the bag and then the bag is closed at the upper end while still suspended from the conveyor. In one embodiment, after a bag has been filled, a pair of pins are moved down into the plane of the bag and then moved away from each other to grasp opposite points of the bag and to pull the mouth of the bag closed. In addition, a heat seal device is actuated to heat seal the facing edges of the bag after the pins have spread the mouth of the bag. After the heat sealing operation has been performed, the pins are withdrawn from the bag so that the bag is free to drop onto a second conveyor for transport to a shipping or storage destination.

It is an object of the invention to improve the operation of a bagging machine for loose fill.

It is another object of the invention to automate the filling, sealing and removal of a series of filled bags from a bagging machine.

It is an object of the invention to provide an improved heat sealing arrangement for sealing bags which have been filled with material.

It is another object of the invention to provide a simple sealing means for sealing a bag in a bagging machine.

It is another object of the invention to facilitate the sealing and removal of a filled bag from a bagging machine.

It is another object of the invention to enhance the operation of an existing bagging machine.

Briefly, the invention provides a bagging machine which is comprised of a conveyor that has at least one opening for depending a bag therefrom and that moves past a bag mounting station at which a bag is suspended from the opening, a bag filling station at which the bag is filled, e.g. with particulate material, and a closing station at which the bag is closed.

In accordance with the invention, the conveyor is provided with a plurality of vertically disposed pins peripherally of the opening for receiving a folded over edge of a bag thereon. In addition, means are provided for moving a bag off at least two of the pins while other means are provided for moving two other pins laterally of the opening between a first position adjacent the opening with an open bag on the pins and a second retracted position spaced from the opening to close the bag disposed on these pins.

In an embodiment where four pins are used to suspend a bag from an opening of the conveyor, two of the pins are stationary and are disposed on opposite sides of the opening to receive the folded over edge of a bag. In addition, the means for moving a bag off each of these pins includes a plate disposed adjacent each stationary pin and a piston and cylinder arrangement for moving the plate between a lowered position under a bag on the pin and a raised position to move the bag off the pin.

The bagging machine is provided with a means for synchronizing movement of each pin and cylinder arrangement relative to the means for moving the movable pins laterally of the opening in the conveyor. In this respect, after a bag has been filled, the piston and cylinder arrangements are actuated to raise the respective plates to push the bag off the two stationary pins. Thereafter, the two movable pins are actuated to spread apart thereby closing the mouth of the bag on itself.

The bagging machine also includes sealing means, e.g. a heat sealing means, for sealing a bag suspended from the two movable pins in the spread apart position thereof. The heat sealing means includes a pair of heat seal bars and means for moving the heat seal bars into engagement with the closed bag in order to heat seal the bag in the closed position.

In accordance with the invention, the sealing means further includes a pair of rubber blocks, each of which is mounted on and projects beyond a respective heat seal bar in facing relation to the other rubber block for grasping a closed bag therebetween prior to heat sealing of the bag. In addition, the rubber blocks are spring mounted on the respective seal bars. The springs are compressible to allow each block to move relative to the respective seal bar in response to the blocks engaging each other. The spring mounting of the rubber blocks allows grasping of the upper end of the bag immediately prior to heat sealing and provides for a secure sealing of the two sides of the bag together.

The heat seal bars are reciprocally mounted within the machine and are driven via separate piston and cylinder units. In addition, an electric heater is electrically connected to each seal bar for heating thereof and a switch is disposed in the path of movement of one of the seal bars for sensing passage of the seal bar thereby. The switch is connected to the heater for actuating the heater in response to movement of the seal bars toward the other. This allows the heater to be actuated as an impulse heater only when necessary and only for a cycle, for example of 1.5 seconds or any other time which is suitable to heat seal the two sides of the bag together.

In accordance with the invention, a severing means is provided to sever the bag above or within the heat sealed area for purposes of removing the bag from the table. For example, a fly knife arrangement is used to sever the bag above the heat sealed area.

The bagging machine employs a station for delivering a flow of particulate material under gravity into a bag suspended from the conveyor. This station includes a hopper from which particulate material may be delivered downwardly to the conveyor and a sleeve disposed at the bottom of the chute in spaced relation to and above the conveyor and the pins thereon for directing the particulate material in the hopper into the opening in a bag. In accordance with the invention, an annular brush extends from the sleeve towards the conveyor to direct the particulate material into a bag suspended from the opening in the conveyor while sealing the flow of particulate material from the surrounding environment. The use of a brush allows the pins and other upstanding elements on the conveyor to pass through the brush without interference with the movement of the conveyor.

These and other objects and advantages of the invention will become more apparent from the following detailed description taken in conjunction with the accompanying drawings wherein:

FIG. 8 illustrates a side view of one heat seal bar assembly in accordance with the invention;

FIG. 9 illustrates a plan view of one end of a seal bar assembly;

FIG. 10 illustrates a view taken on line 10—10 of FIG. 9;

Figure 1:
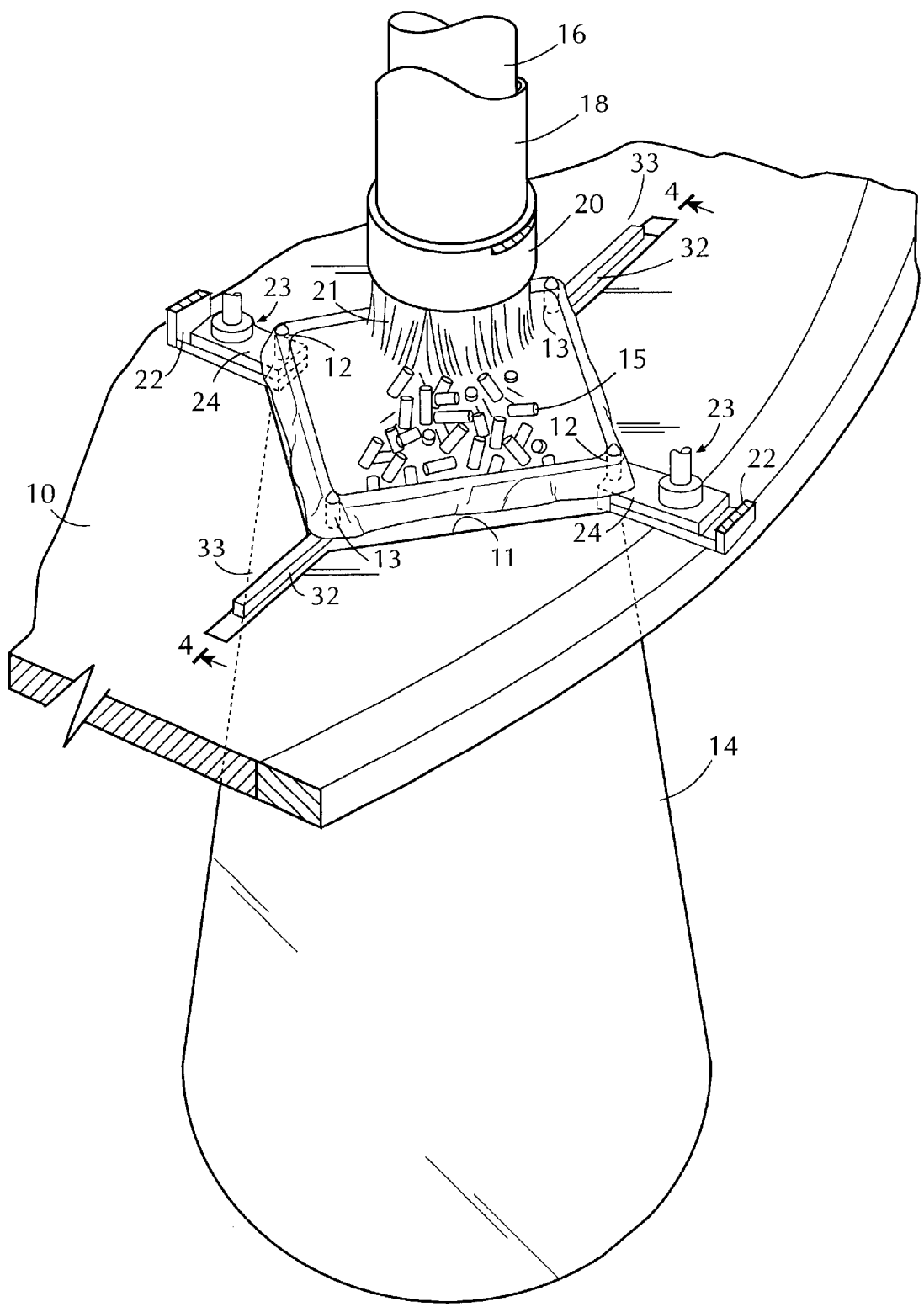
FIG. 1 illustrates a part-perspective view a rotary conveyor constructed in accordance with the invention in a filling station.

Referring to FIG. 1, the bagging machine is constructed in a manner similar to the bagging machine described in U.S. Pat. No. 6,035,606. In this respect, the bagging machine comprises a conveyor in the form of a rotary table for rotation about a vertical axis of rotation. In addition, the table 10 includes a plurality of openings 11 (e.g. four openings) and a plurality of upstanding pins 12, 13 on the table 10 disposed peripherally of each opening 11. For simplicity, only one opening and set of pins will be described herein.

The bagging machine includes a first station disposed peripherally of the table 11 for manually receiving and suspending a bag 14 from the pins 12, 13 and through the opening 11, a second station where air is blown into the bag 14 to open the bag 14, a third station where the bag 14 is filled with particulate material 15 and a fourth station where the bag 14 is sealed.

The bag 14 is made of any suitable material, such as a transparent plastic, that is provided with rows of holes to allow air to flow through.

The third station, as shown in FIG. 1, is disposed peripherally of the table 10 for delivering a flow of particulate material 15 under gravity into a bag 14 suspended from the table 10. This station includes a chute 16 disposed in fixed relation on a frame (not shown) in spaced relation to and above the table 10 for delivering the particulate material 15 from a hopper 17 (see FIG. 14). The chute 16 may be mounted to be raised and lowered relative to the table 10 so that when the particulate material is to be discharged, the chute 16 is lowered into the mouth of the bag 14 to reduce the amount of material that might otherwise be carried out of the bag by an air stream. After filling of the bag 14, the chute 16 is raised out of the path of movement of the table 10 and the parts thereon.

In the illustrated embodiment the chute 16 remains stationary and a sleeve 18 is disposed about the chute 16. A piston and cylinder arrangement 19 is also mounted on the frame in order to raise and lower the sleeve 18 relative to the mouth of the chute 16, in order to avoid interference with the pins 11,12 or any other elements on the rotating table 10.

Alternatively, the sleeve 18 may be stationary while an annular brush 20 is mounted concentrically of the sleeve 18 to extend from the sleeve 18 towards the table 10 to direct particulate material into a bag 14 while sealing the flow of particulate material from the surrounding environment. The brush 20 is provided with bristles 21 which allow the pins an any other elements on the top of the table 10 to pass therethrough without interfering therewith.

Figure 2:
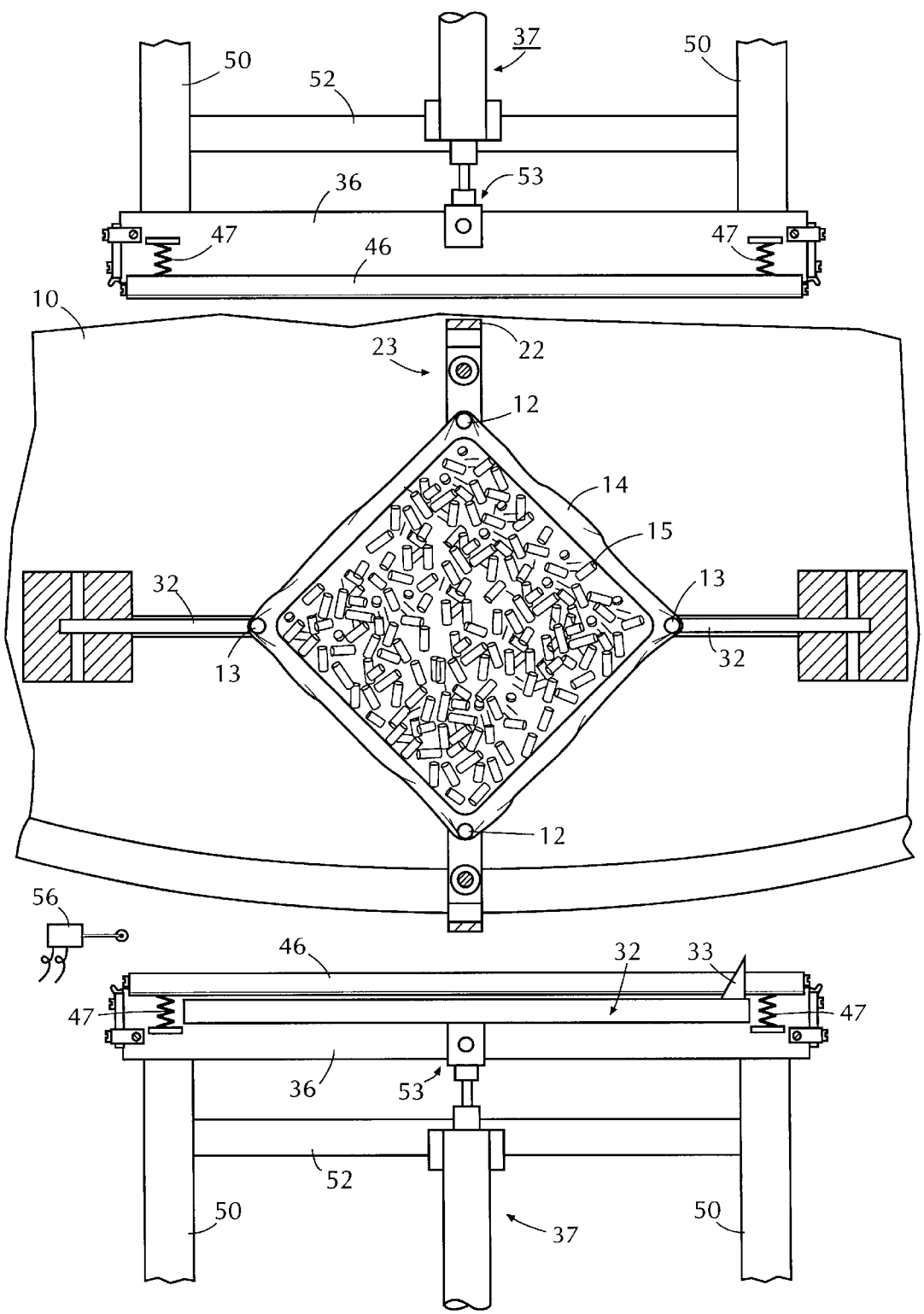
FIG. 2 illustrates a plan view of the conveyor part of FIG. 1 at a sealing station with the heat seal bars in a fully open position.

Referring to FIGS. 1 and 2, one pair of pins 12 are vertically disposed on diametrically opposite sides of the opening 11 for receiving an edge of the bag 14 thereon. For example, each pin 12 is pointed and the bag 14 is staked thereon. Each pin 12 is fixed to a bracket 22, which, in turn, is secured to the table 10 in fixed manner. In addition, a means 23 is provided for moving a bag off each pin 12.

Figure 4:
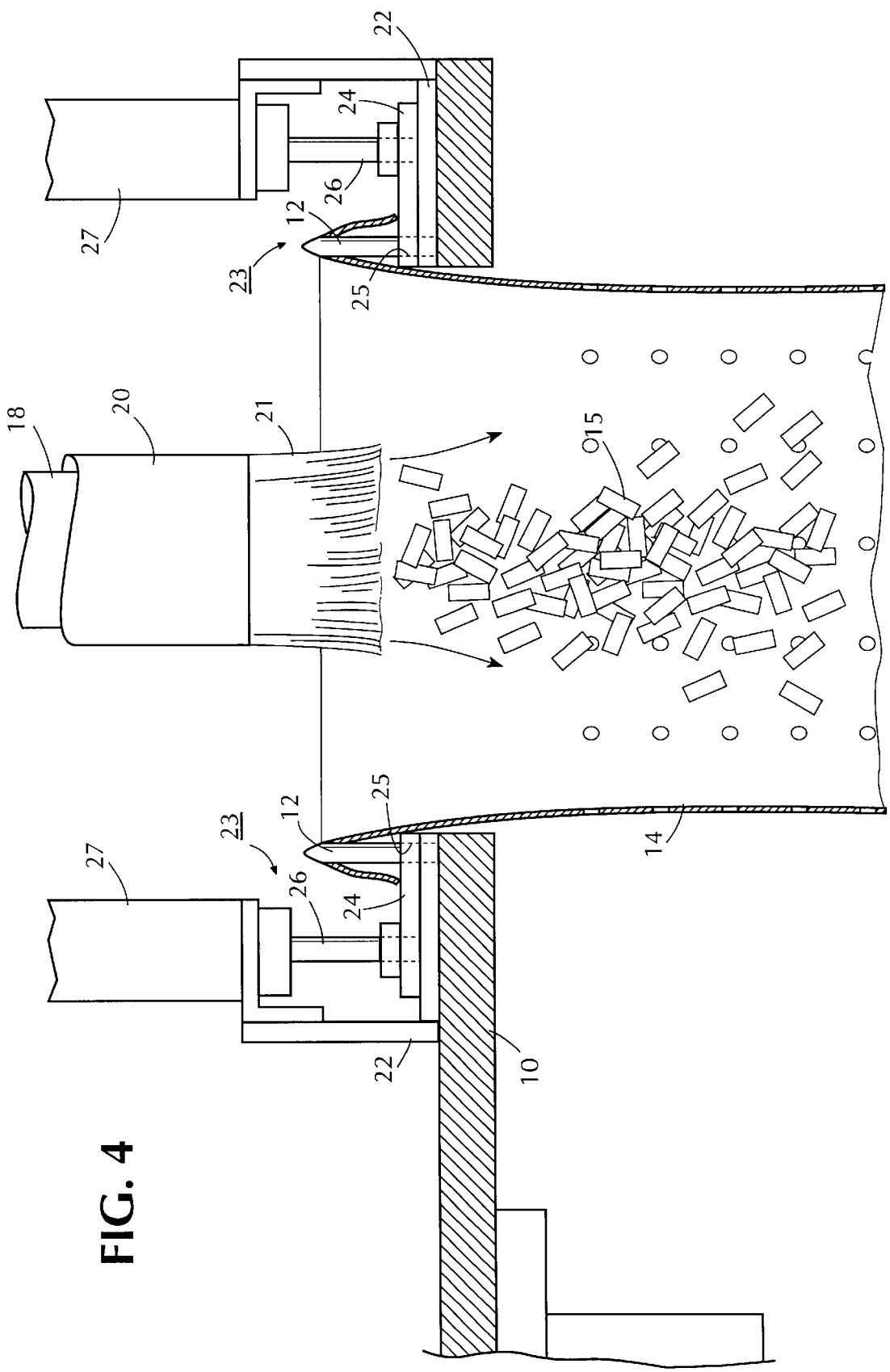
FIG. 4 illustrates a side view of a stationary means employing a vertical pin and means for moving a bag off the pin in accordance with the invention.
Figure 5:
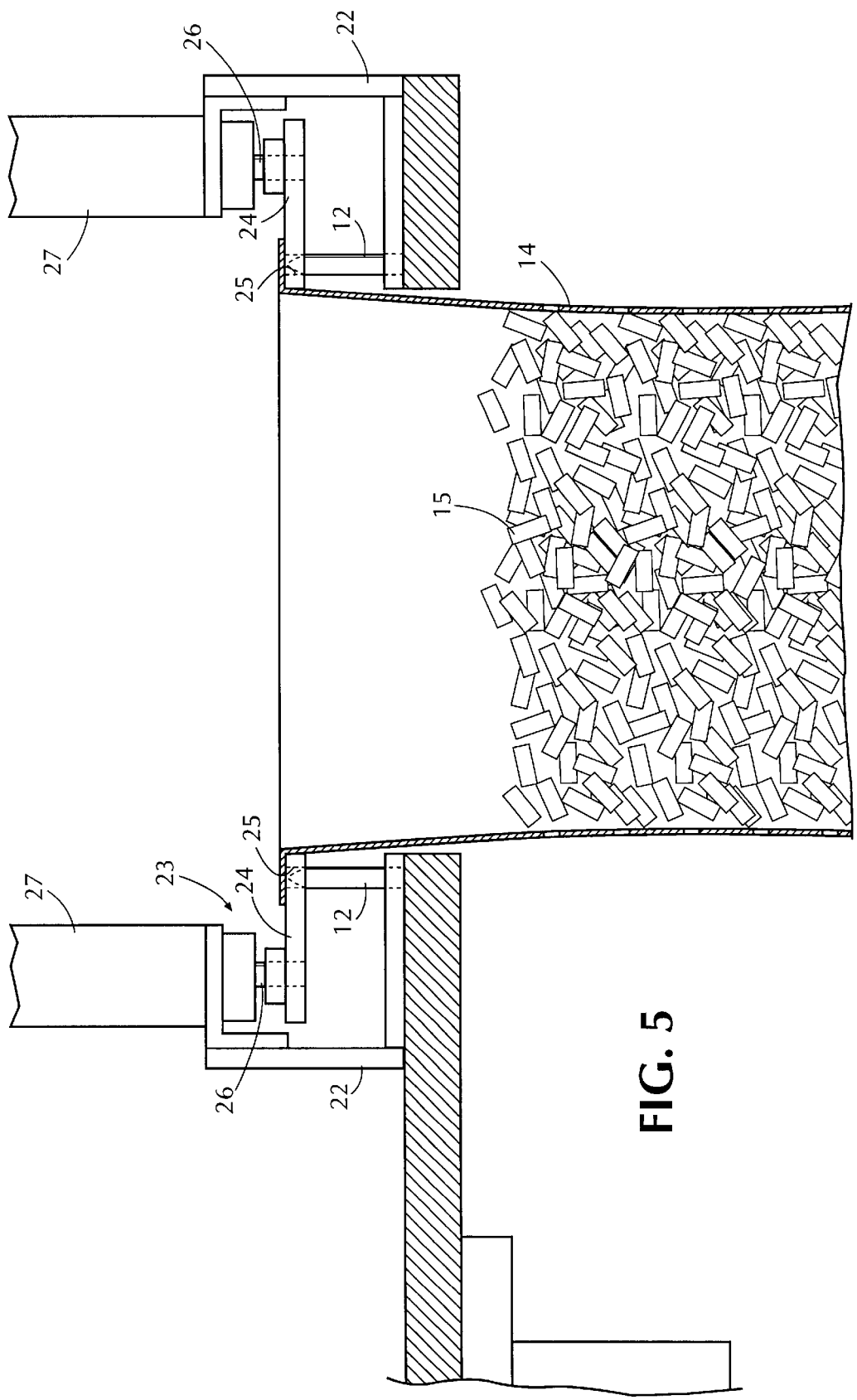
FIG. 5 illustrates a side view similar to FIG. 4 with a bag removed from the pins in accordance with the invention.

Referring to FIG. 4, each means 23 includes a plate 24 which has an aperture 25 through which a pin 12 passes. Each plate 24 is, in turn, connected to a piston 26 of a piston and cylinder arrangement 27 mounted on the bracket 22 so that the plate 24 may be moved between a lowered position as shown in FIG. 4 under a folded over portion of the bag 14 and a raised position as shown in FIG. 5 to move the bag 14 off the pin 12.

Figure 6:
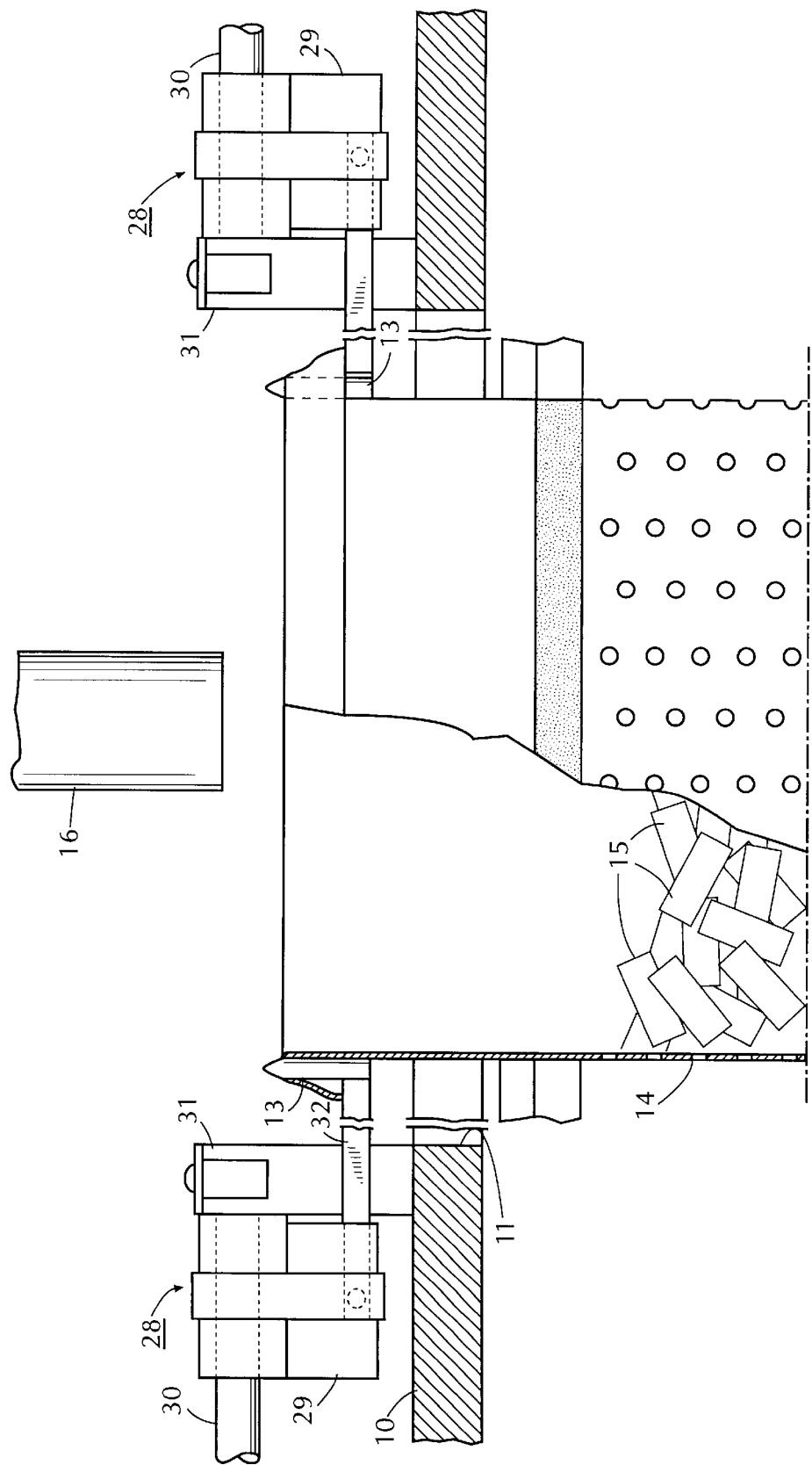
FIG. 6 illustrates a side view of a pair of pins for bringing the upper ends of a bag together in accordance with the invention.
Figure 7:
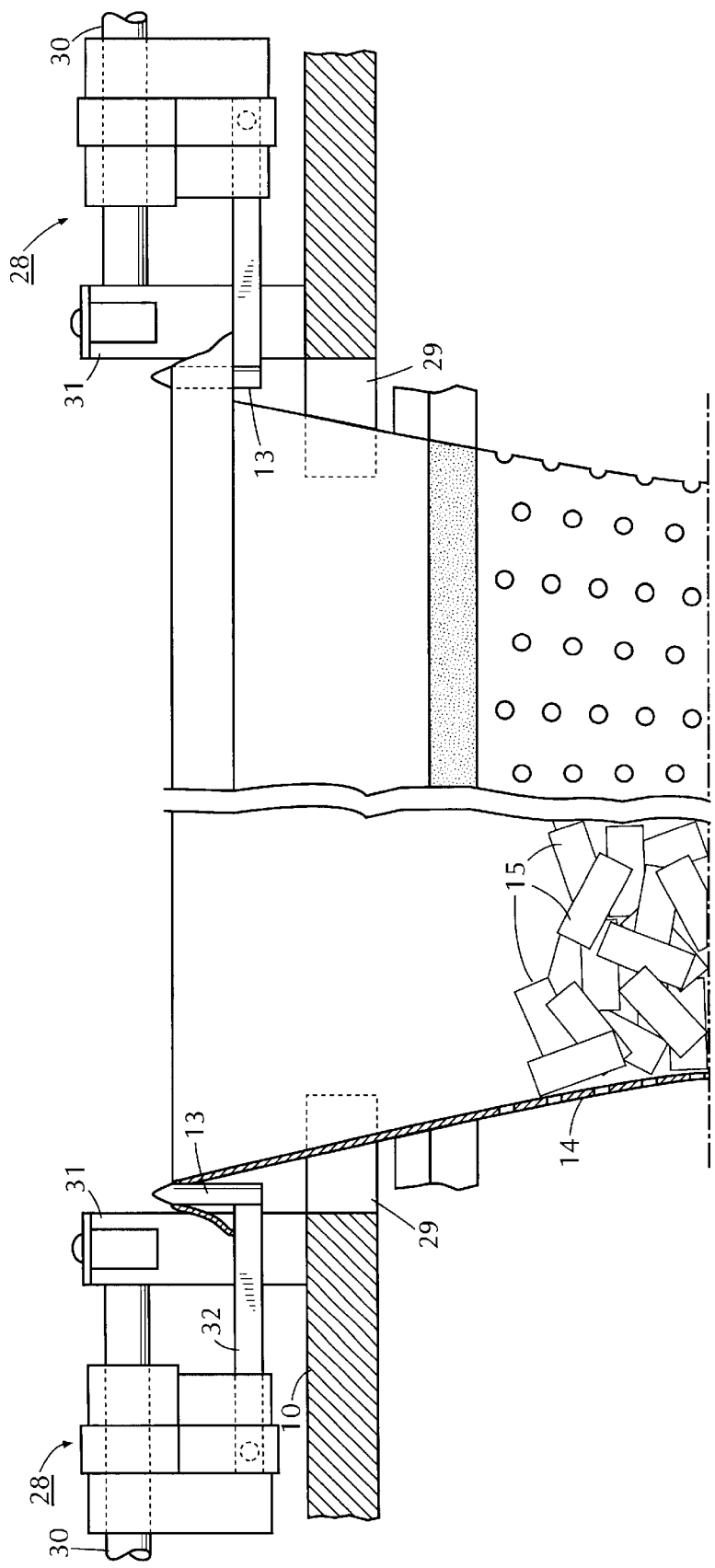
FIG. 7 illustrates a view similar to FIG. 6 with the movable pins in a retracted position.

Referring to FIGS. 1 and 6, each laterally movable pin 13 is also pointed to receive an edge of the bag 14 in a staked manner and is mounted on a means 28 for moving the pin 13 laterally of the opening 11 between a first position as shown in FIGS. 1 and 6 and a second retracted position spaced from the opening 11 to close the bag 14.

As shown in FIG. 1, the table 10 is provided with a pair of lateral slots 29 to accommodate movement of the pins 13.

Referring to FIG. 6, the means 28 for moving a pin 13 include a block 29 which is slidably mounted on a pair of rails 30 (only one of which is illustrated) that, in turn, are mounted at the ends on blocks 31 (only one of which is shown) secured to the table 10.

Figure 3:
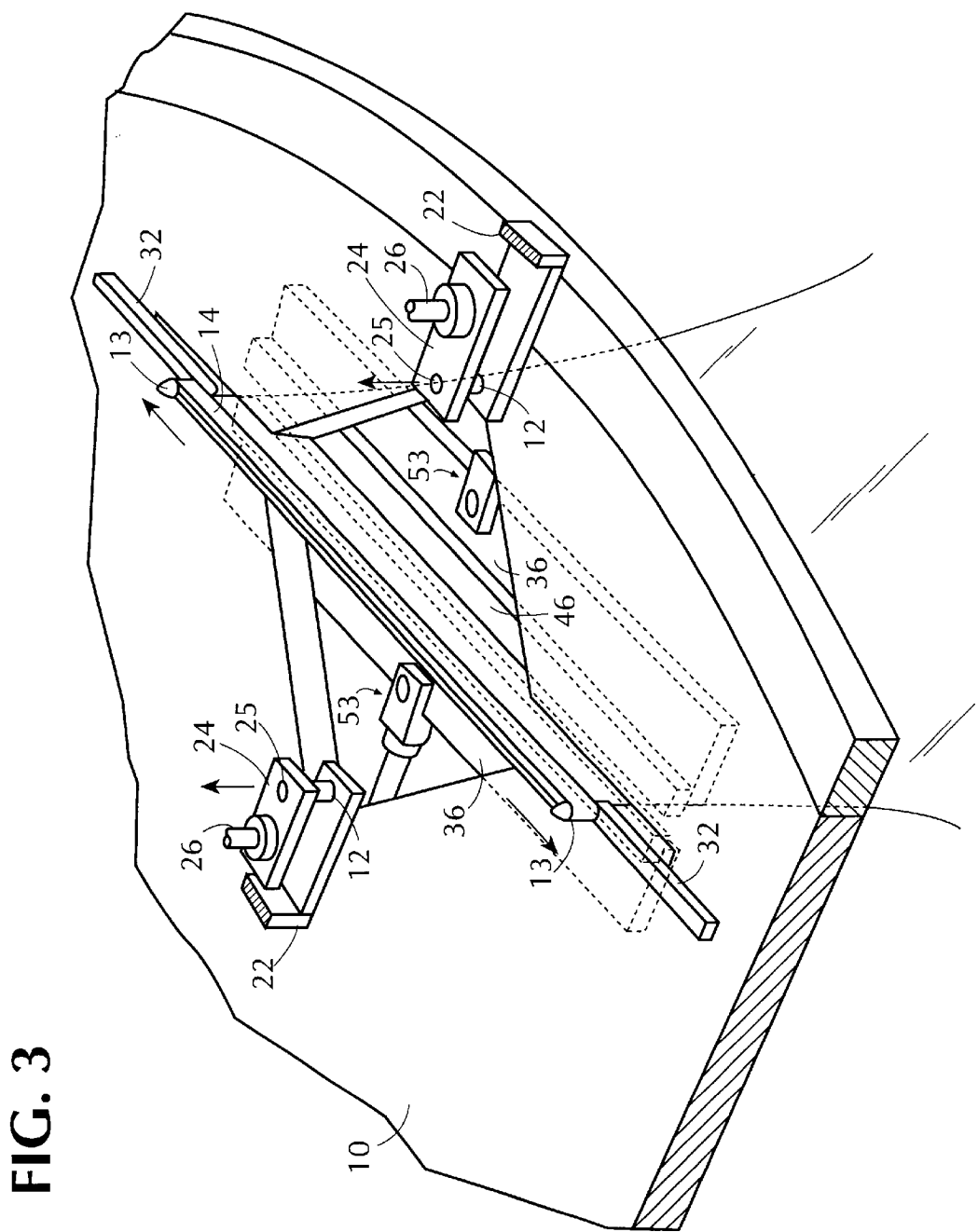
FIG. 3 illustrates a part-perspective view of the conveyor part shown in FIG. 2 at a sealing station with the heat seal bars in a partially closed position.

Typically, the block 29 is actuated automatically to reciprocate along the rails 30. Each block 29 has a horizontally disposed rod 32 mounted on an extending therefrom. Each rod 32, in turn, has a pin 13 secured thereon at the end. The bagging machine is provided with a suitable means (not shown) for synchronizing movement of the piston and cylinder arrangement 23 relative to the means 28 for moving the pins 13 laterally of the opening 11 from the table 10. In this respect, after a bag 14 has been filled with particulate material as indicated in FIG. 1, the piston and cylinder arrangements 23 are actuated to move the filled bag 14 off the stationary pins 12. At the same time, the two movable pins 13 are moved from the position shown in FIG. 1 to a retracted position as indicated in FIG. 3. During this time, the mouth of the bag is flatted so that two sides come into parallel relation to each other for sealing purposes. Typically, this closing of the mouth of the bag occurs as the table 10 rotates from the filling station (FIG. 1) to the sealing station (FIG. 2). Alternatively, closing of the mouth of the bag 14 may occur when the bag 14 is positioned in the sealing station.

After the table 10 has been indexed to the sealing station (FIG. 2), a sealing operation takes place.

As shown in FIG. 2, the sealing station includes sealing means 35 for sealing a bag 14 suspended from the pins 13 in the retracted position. This sealing means 35 includes a pair of heat seal bars 36 that are disposed in spaced apart parallel relation, and means 37 for moving the heat seal bars 36 between an open position spaced from each other (FIG. 2) and a closed position (see FIG. 3) into engagement with a closed bag 14 to heat seal the bag in the position thereof.

Referring to FIGS. 2, 3, 8 and 9, each seal bar 36 is elongated to extend across the opening 11 in the table 10 and is of sufficient length to heat seal a flatted bag 14. Each seal bar 36 carries a heat conductive strip 38 (see FIG. 9) on the face that is secured by a screw 39 to an insulation block 40 mounted on each end of the seal bar 36. The block 40 is held in place by a mounting strap 41 secured to the seal bar 36 by screws 42 (only one of which is shown) and a screw 43 that passes through the block 40 into the bar 36. The heat conductive strip 38 is connected via a cable (not shown) to an electrical heater (not shown).

In addition, as shown in FIGS. 9 and 10, a heat insulation strip 44, for example of Teflon®, is secured to the seal bar 36 to cover the heat conductive strip 38 to avoid a heat concentration that might otherwise burn through the material of a bag 14. A foam strip 45 is placed between the heat conductive strip 38 and the insulation strip 44 to provide a resilient mounting.

As shown in FIG. 2, a rubber block 46 is mounted on each seal bar 36 and projects therefrom in order to engage a rubber block 46 on the other seal bar 36 (see FIG. 3). Typically, the rubber block 46 is disposed in and projects from a U-shaped holder of rigid material for mounting purposes. In addition, a plurality of springs 47 are provided between the seal bar 36 and the rubber block 46 for biasing the rubber block 46 outwardly of the seal bar 36 and toward the other rubber blocks 46. The springs 47 are compressible to allow the rubber blocks 46 to move relative to the seal bars 36 in response to the rubber blocks 46 engaging with each other with a bag 14 sandwiched therebetween.

Referring to FIGS. 2 and 8, the means 37 for moving a respective heat seal bar 36 are constructed in similar fashion. Accordingly, only the details of one such means will be described.

The means 37 for moving a heat seal bar 36 includes a frame 48 secured in fixed relation to a support (not shown) under the rotary table 10. The frame 48 has a pair of upright plates 49 that carry a pair of rods 50 in parallel relation. In addition, a piston and cylinder unit 51 is carried on the frame 48 via a transverse beam 52 and is articulated to the seal bar 36 through a suitable linkage 53 to move a seal bar 36 between a retracted position and an extended position.

As shown in FIG. 8, the seal bar 36 is mounted on a plate 54 that is, in turn, mounted on a pair of blocks 55 that are slidably mounted on the rods 50. Upon actuation of the piston and cylinder unit 51, the seal bar 36 is caused to move and the plate 54 and blocks 55 slide along the rods 50.

In addition, a switch 56 (FIG. 2) is mounted on one of the blocks 55 for moving with a seal bar 36 in order to signal the passage of the seal bar 36 past a predetermined point. This switch is connected to the heater for heating the heat conductive strips 38 in response to the movement of the seal bar 36 toward the other seal bar 36. In this way, the heater need not be activated until the heat seal bars 36 are moving toward each other. Also, the switch allows the heater to be cycled for a programmed time, for example, 1.5 seconds in order to effect a heat seal of the bag 14 via the seal bars 36. At completion of the heat sealing cycle, the heat seal bars 36 are retracted from each other.

After the table 10 has been indexed to bring the filled bag 14 to the sealing station (FIG. 3), the means for moving the pins 13 are actuated to move the pins away from the opening 11 into the retracted position as shown in FIG. 3. Thereafter, the heat seal bars 36 are moved together so that the rubber blocks 46 abut each other. Continued movement allows the two heat seal bars 36 to come into engagement with opposite sides of the bag 14 to effect a heat sealing of the opposite sides of the bag together.

Figure 11:
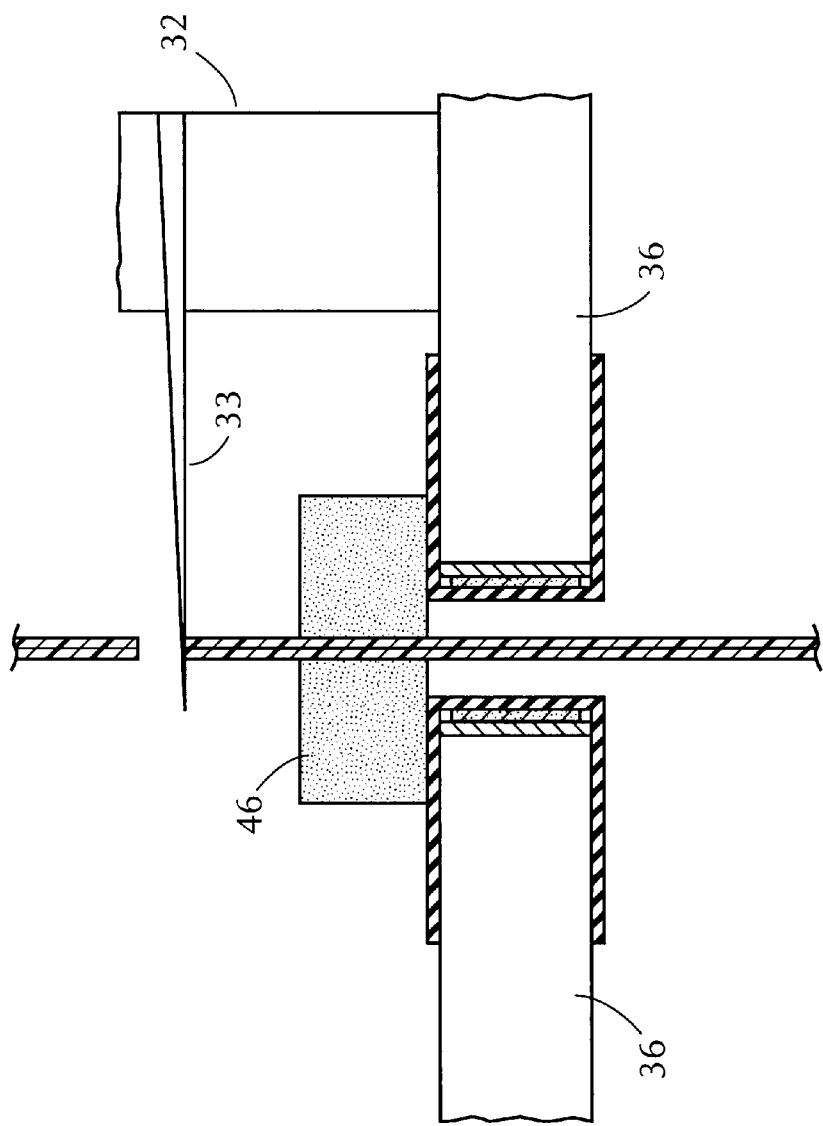
FIG. 11 illustrates a cross-sectional view of a fly knife arrangement for severing the bag after closure.
Figure 12:
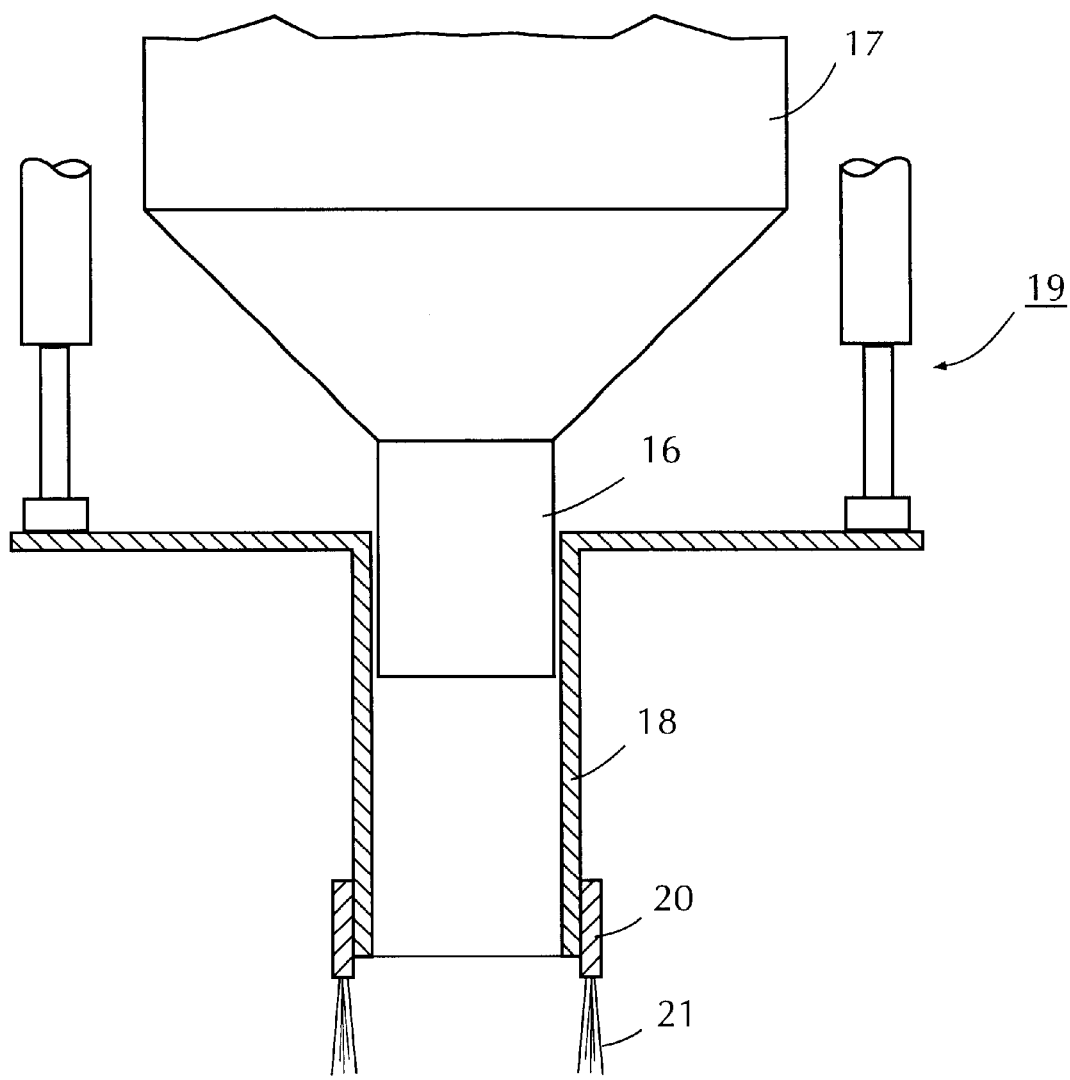
FIG. 12 illustrates a part cross-sectional view of a brush mounted on a hopper in accordance with the invention.

Referring to FIG. 11, a severing means 32 is provided to sever the bag 14 for purposes of removing the bag 14 from the table 10, e.g. below the pins 12,13 and above the seal bars 36. This severing means 32 is constructed in the form of a fly knife arrangement and is mounted on one of the seal bars 36. By way of example, the fly knife arrangement includes a Lintra®-Lite Actuator sold by Norgen of Brookville,Ohio made by Norgen and mounted on the seal bar 36 as well as a horizontally disposed blade 33 that is secured to a movable slider of the actuator to be reciprocated along the length of the sealing bar 36 to sever the bag 14 above the heat sealed portion of the bag 14 in one pass.

After severance of the bag 14, the bag 14 may be removed manually or may drop onto a conveyor for automated removal from under the table 10. The strip of waste above where the knife blade 33 cuts may be removed manually at the first station when a new bag is mounted on the table 10.

During operation, while the sealing bars 36 are still in engagement with the bag 14, the fly knife arrangement 32 is actuated to cut the bag 14. Thereafter, the sealing bars 36 are retracted to allow removal of the bag 14.

In another embodiment (not shown), the pins on which a bag is mounted may be of a blunt type and the bag may be placed over the pins with a folded over edge. In addition, each rod 32 may have a cutting blade 33 (not shown) secured thereon in closely spaced relation to the pin 13 with a razor sharp edge 34 extending at an angle for foming a slit in the folded over edge of the bag after the bag has been heat sealed. At the end of the heating cycle, the heat seal bars 36 are retracted from one another. At this time, the sealed bag remains on the two pins 13. Next, the means 28 for moving the pins 13 are actuated to move from a position back to the original position as shown in FIG. 1. However, due to the heat sealing of the opposite sides of the bag together, the top of the bag 14 is relatively stiff and wider than the remainder of the bag 14. Accordingly, as the pins 13 move back towards the opening 11 and the original position, each pin 13 slides along the side of the closed end of the bag and each cutting blade 33 cuts through the folded over portion of the bag 14 to form a slit. The bag may then be pulled from under the table or the weight of the contents in the bag 14 may cause the bag to sag downwardly. In either case, the slit in the folded over portion of the bag 14 moves over and past the upstanding pin 13 so that the filled bag 14 is able to fall under gravity off the pins 13 onto a conveyor (not shown) located below the table 10.

Alternatively, the heat seal bar assembly may be provided with a cutting wire to physically cut the bag along the line above the heat sealed area so that a filled bag may be deposited onto a conveyor below the table 10 when the heat seal bars are retracted from each other. In this embodiment, the remaining section of the bag on the pins 13 may be manually removed and discarded as waste. For example, the remainder of the bag may be removed when the table 10 is indexed to the bag mounting station to receive a fresh bag.

What is claimed is:

1. A bagging machine comprising
   a conveyor having at least one opening for depending a bag therefrom; and
   a plurality of vertically disposed pins disposed peripherally of said opening for receiving an edge of a bag thereon;
   a pair of means for moving a bag off at least two of said pins; and
   means for moving two other pins of said pins laterally of said opening between a first position adjacent said opening with an opened bag on said pins thereof and a second position spaced from said opening to close the bag disposed on said pins thereof.

2. A bagging machine as set forth in claim 1 wherein said two other pins are disposed on diametrically opposite sides of the opening in said conveyor.

3. A bagging machine as set forth in claim 1 wherein each said means for moving a bag off a respective pin includes a plate disposed adjacent said respective pin and a piston and cylinder arrangement connected to said plate to move said plate between a lowered position under a bag on said respective pin and a raised position to move the bag off said respective pin.

4. A bagging machine as set forth in claim 3 wherein each said plate has an aperture receiving a respective pin therein.

5. A bagging machine as set forth in claim 4 which further comprises means for synchronizing movement of said piston and cylinder arrangement relative to said means for moving said two other pins laterally of said opening in said conveyor.

6. A bagging machine as set forth in claim 5 which further comprises sealing means for sealing a bag suspended from said two other pins in said second position thereof.

7. A bagging machine as set forth in claim 6 wherein said sealing means includes a pair of heat seal bars and means for moving said heat seal bars into engagement with a closed bag to heat seal the bag in the closed position thereof.

8. A bagging machine as set forth in claim 7 wherein said heat seal bars are disposed on an underside of said conveyor from said pins.

9. A bagging machine as set forth in claim 7 which further comprises a fly knife positioned above said seal bars for severing a bag disposed between said seal bars.

10. A bagging machine comprising
a conveyor having at least one opening for depending a bag therefrom;
a pair of stationary pins vertically disposed on opposite sides of said opening for receiving an edge of a bag thereon;
a pair of movable pins vertically disposed on opposite sides of said opening for receiving an edge of a bag thereon; and
means for moving each of said movable pins laterally of said opening between a first position adjacent said opening with an opened bag on said movable pins and a second position spaced from said opening to close the bag disposed on said movable pins.

11. A bagging machine as set forth in claim 10 which further comprises sealing means for sealing a bag on said movable pins in said second position thereof.

12. A bagging machine as set forth in claim 11 wherein said sealing means include a pair of heat seal bars and means for moving said heat seal bars into engagement with a closed bag to heat seal the bag in the closed position thereof.

13. A bagging machine as set forth in claim 12 wherein said sealing means further includes a pair of rubber blocks, each said rubber block projecting beyond a respective heat seal bar in facing relation to a rubber block projecting beyond the other of said heat seal bars for grasping a closed bag therebetween.

14. A bagging machine as set forth in claim 13 wherein said rubber blocks are spring biased toward each other.

15. A bagging machine as set forth in claim 14 further comprising a pair of means for moving a bag off each of said stationary pins, each said means for moving includes a plate disposed adjacent said respective stationary pin and a piston and cylinder arrangement connected to said plate to move said plate between a lowered position under a bag on said respective stationary pin and a raised position to move the bag off said respective stationary pin.

16. A bagging machine comprising
a rotary table for rotation about a vertical axis of rotation, said table having a plurality of circumferentially disposed openings therein;
a pair of movable pins disposed on said table on opposite sides of each of said openings for receiving an edge of a bag thereon; and
means on said table for moving each of said movable pins laterally of said respective opening between a first position adjacent said opening with an opened bag on said movable pins and a second position spaced from said opening to close the bag disposed on said movable pins.

17. A bagging machine as set forth in claim 16 which further comprises sealing means for sealing a bag on said movable pins in said second position thereof.

18. A bagging machine as set forth in claim 17 wherein said sealing means includes a pair of heat seal bars and means for moving said heat seal bars into engagement with a closed bag to heat seal the bag in the closed position thereof.

19. A bagging machine as set forth in claim 18 wherein said sealing means further includes a pair of rubber blocks, each said rubber block projecting beyond a respective heat seal bar in facing relation to a rubber block projecting beyond the other of said heat seal bars for grasping a closed bag therebetween.

20. A bagging machine as set forth in claim 17 which further comprises a cutting blade positioned above said sealing means to move along said sealing means for severing a bag disposed above said sealing means.

21. A bagging machine as set forth in claim 16 which further comprises a pair of stationary pins disposed on opposite sides of each said opening and in transverse relation to said movable pins for receiving an edge of a bag thereon and a pair of means for moving a bag off said stationary pins.

22. A bagging machine as set forth in claim 21 wherein each said means for moving a bag off a respective stationary pin includes a plate disposed adjacent said respective stationary pin and a piston and cylinder arrangement connected to said plate to move said plate between a lowered position under a bag on said respective stationary pin and a raised position to move the bag off said respective stationary pin.

23. A bagging machine comprising
a rotary table for rotation about a vertical axis of rotation, said table including at least one opening and a plurality of upstanding pins on said table disposed peripherally of said opening therein;
a first station disposed peripherally of said table for suspending a bag from said pins and through said opening; and
a second station disposed peripherally of said table for delivering a flow of particulate material under gravity into a bag suspended from said table, said second station including a sleeve disposed in spaced relation to and above said table and said pins thereon for delivering the particulate material therefrom and an annular brush extending from said sleeve towards said table to direct particulate material into a bag suspended from said opening while sealing the flow of particulate material from the surrounding environment.

* * * * *